Patented Jan. 18, 1949

2,459,424

UNITED STATES PATENT OFFICE 2,459,424

ANTHRIMIDE CARBAZOLE DYESTUFFS

Hermann Hauser, Binningen, and Max Bommer, Riehen, Switzerland, assignors to the Swiss firm of Ciba Limited No Drawing. Application April 20, 1943, Serial No. 483,804. In Switzerland April 18, 1942

Section 1, Public Law 690, August 8, 1946
Patent expires April 18, 1962

2 Claims. (Cl. 260—316)

The present invention is concerned with new anthraquinone dyestuffs and more particularly those of the anthrimide type, i. e. of that type of dyestuffs in which anthraquinone radicals are interconnected with other radicals by means of imino groups. The said other radicals may also be anthraquinone radicals, or may be of another type, preferably aromatic. The present invention is also concerned with dyestuffs of the so-called anthrimide-carbazole type. Anthrimide-carbazoles are usually obtained by treating anthrimides with condensing agents such as aluminium chloride or in some cases sulfuric acids and its functional derivatives, such as chlorosulfonic acid.

Further objects of the present invention will appear as the specification proceeds.

Many anthrimides and anthrimide-carbazoles are well known in the art. Some very fast vat dyestuffs of the anthraquinone series belong to this group. Vat dyestuffs are usually dyed from the vat, but there is another very important way for making use of vat dyestuffs, which consists in transforming the vat dyestuffs into leuco sulfuric acid esters. The said esters are reconvertible to the parent dyestuffs by acid oxidation, and are valuable products for dyeing and especially for printing textiles of different kinds.

It is well known in the art that many of the most valuable and fastest vat dyestuffs of the anthrimide-carbazole type suffer from the drawback that they are either not convertible into leuco-sulfuric acid esters, or that their leuco-sulfuric acid esters are not reconvertible to the parent dyestuff by acid oxidation. It is further known that anthrimide carbazoles which are free from substituents as a rule do not show this drawback, but that many substituted anthrimide-carbazoles, especially those containing acylamino-groups, are defective in this way. Whereas anthrimide-carbazoles derived for instance from 1-amino-4- or 5-benzoylaminoanthraquinone often show superior fastness in comparison with those derived from 1-aminoanthraquinone, their value is greatly impaired by the fact that most of them do not lend themselves to the above mentioned use as leuco sulfuric acid esters.

It is an object of the present invention to provide new and valuable dyestuffs of the anthrimide carbazole series which, although containing acylamino groups, are well suited for conversion into leuco sulfuric acid esters, and for dyeing and printing therewith according to the methods known for this purpose.

It is a further object of the present invention to provide new dyestuffs dyeing valuable shades not easily obtainable by known dyestuffs, for instance green shades of very good fastness.

It has been found that anthraquinone derivatives can be obtained from the reaction between anthraquinone derivatives of the general formula:

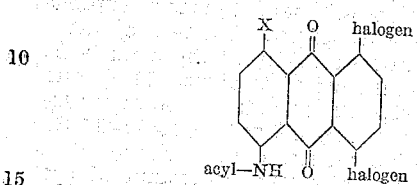

wherein X may be a substituent, and 1-aminoanthraquinone, i. e. an amine which contains a reactive hydrogen atom in the amino group and if necessary treating the products of the reaction with condensing agents.

The 1:4-dihalogen-5-acylaminoanthraquinones, in particular the 1:4-dichloro compounds which may have in the 8-position a substituent such as a free or substituted (e. g. acylated) amino group, a nitro or alkoxy group, may be obtained for example by acylation of the corresponding amino compounds. Suitable acylating agents are: acids of the aliphatic, hydroaromatic and heterocyclic series, in a form suitable for the acylation of amines, in particular as the acid halides. Examples of acyl radicals are those of acetic acid, cinnamic acid, nicotinic acid and, in particular, benzoic acid and its substitution products, such as parachlorobenzoic acid.

For the reaction with the 1:4-dihalogen-5-acylaminoanthraquinones, 2 mols of the 1-aminoanthraquinone are used for each mol of the latter. The reaction is preferably carried out in a solvent or diluent having a high boiling point, such as nitrobenzene or naphthalene, and in the presence of an acid binding agent, such as sodium carbonate, and of a catalyst such as a copper salt.

The products of the reaction obtained can be treated with condensing, in particular with carbazolizing agents, e. g. with aluminum chloride or titanium tetrachloride alone or in combination with sodium chloride, tertiary aromatic bases, ammonia, organic nitriles and sulphurous acid. The products of the reaction may also be treated with condensing agents which have an oxidizing action or may split off water, e. g. with acid condensing agents such as sulphuric acid or chlorosulphonic acid, when sulphonation may occur. So far as the reactions described in this paragraph form compounds rich in hydrogen, it is advisable to subject the products obtained to oxidation with, for example, an alkaline hypochlorite solution, a sodium nitrite solution in an acid medium, or a perborate solution.

The condensation products obtainable by this process can also be treated with substituting agents, when further valuable products are obtained. Examples of such agents are: halogens and agents which liberate halogens, and alkylating agents.

The new products can be converted by known methods into the leuco derivatives, e. g. into the leuco sulphuric acid ester.

The products of the invention mentioned in the present application represent partly dyestuffs and partly valuable intermediate products; they can be used, for example, for dyeing and printing vegetable fibres and, so far as they contain acid groups, also for dyeing animal fibres, such as wool. The dyes and prints obtained with them are very fast.

The following examples illustrate the invention, the parts being by weight unless otherwise stated:

Example 1

39.6 parts of 1-benzoylamino-5,8-dichloranthraquinone, 50 parts of 1-aminoanthraquinone, 25 parts of sodium carbonate, 2 parts of cuprous chloride and 400 parts of naphthalene are heated together for 15 hours until the naphthalene boils. The mixture is then cooled to about 130° C. and 800 parts of chlorobenzene added. The well crystallized product is then filtered off at 50–55° C., washed with chlorobenzene, the pressed mass steam-distilled and the new compound of the probable formula:

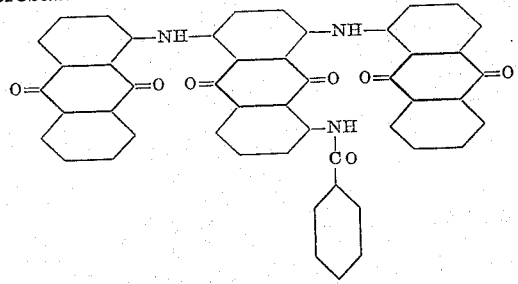

isolated by filtration. It dissolves in concentrated sulphuric acid to a green solution. If nitrobenzene is used instead of naphthalene, as solvent, the same product is obtained.

Example 2

19.8 parts of the product of the reaction between 1 mol of 1:4-dichloro-5-aminoanthraquinone and nicotinyl chloride hydrochloride (yellow-green crystalline powder of melting point 148–152° C.), 25 parts of 1-amino-anthraquinone, 15 parts of sodium carbonate, 1 part of cuprous chloride and 200 parts of napthalene are heated to boiling for 15 hours. The product of the reaction is then diluted at about 130° C. with 400 parts of chloro-benzene and the new compound of the probable formula:

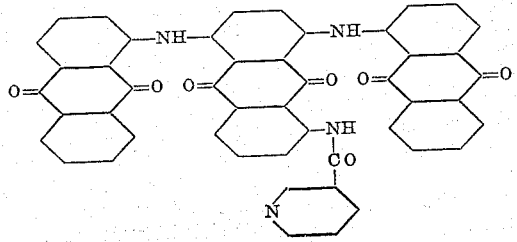

worked up as described in Example 1. It crystallizes in needles and dissolves in concentrated sulphuric acid to a grass-green solution.

Example 3

21 parts of 1-para-chlorobenzoylamino-5:8-dichloroanthraquinone (green-yellow needles melting at 277–279° C.), 25 parts of 1-aminoanthraquinone, 15 parts of sodium carbonate, 1 part of cuprous chloride and 300 parts of naphthalene are heated to boiling for 15–18 hours. At about 130° C. the melted mass is diluted with chlorobenzene and worked up as described in Example 1. 40 parts of a dark violet-brown product of the probable formula:

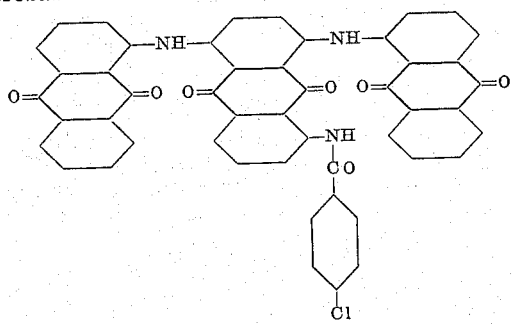

which dissolves in concentrated sulphuric acid to an olive-green solution, are obtained.

Example 4

40 parts of ground, anhydrous aluminum chloride are slowly added to 80 parts of pyridine at 50–100° C. At about 100° C. 20 parts of the trianthrimide described in Example 1 obtained from 1 mol of 1:4-dichloro-5-benzoylaminoanthraquinone and 2 mols of 1-aminoanthraquinone are added to this melted mass. The whole is then heated to boiling for 1 hour and added to dilute caustic soda solution. After distilling off the pyridine, the new dyestuff can be isolated by filtration. It dyes cotton a very fast dark brown shade, from a brown vat. In concentrated sulphuric acid it dissolves to a violet solution. According to known methods this dyestuff can be converted into a very valuable leuco sulfuric acid ester.

The trianthrimides of Examples 2 and 3 also give, under the same conditions, dyes which dye cotton from the vat a very strong fast brown shade. These dyestuffs too are convertible into leuco sulfuric acid esters of remarkable value.

Example 5

100 parts of anhydrous aluminium chloride and 12 parts of dry sodium chloride are melted together at 125–130° C. To this melted mass 20 parts of the trianthrimide described in Example 1 and prepared from 1 mol of 1:4-dichloro-5-benzoyl-aminoanthraquinone and 2 mols of 1-aminoanthraquinone are slowly added. The whole is stirred for 90 minutes at 125–130° C. and the melted mass added to 500 parts of water and 100 parts of concentrated hydrochloric acid, the suspension of dye heated to boiling into which a solution of 5 parts of sodium chlorate in 50 parts of water at 90–95° C. is allowed to drop slowly, and the whole heated for a further half hour to boiling. The dyestuff formed is isolated by filtering hot, washed with water until neutral, and dried. It dissolves in concentrated sulphuric acid to a violet-brown solution and dyes cotton strong brown shades from a brown vat.

Example 6

20 parts of titanium tetrachloride are allowed to drop into 60 parts of pyridine at 50–100° C., and 10 parts of the trianthrimide described in Example 1 added at about 100° C. The whole is stirred for 2 hours at 125–135° C. and the melted mass added while still hot to dilute caustic soda solution; the pyridine is driven off in steam and sodium hydrosulphite added to the brown suspension of the new dyestuff until the latter goes into solution in the form of a brown vat. The dyestuff which is present in the leuco form is now filtered off and precipitated from the filtrate by oxidation with air. It dissolves in concentrated sulphuric acid to a violet-brown solution and dyes cotton a strong brown shade.

Example 7

0.5 part of the dyestuff mentioned in Example 4, first paragraph, is made into a paste with 6 parts by volume of caustic soda solution (36° Bé.) and 100 parts of water at 40–50° C., 2 parts of hydrosulphite conc. powder are added, and vatted for 30 minutes at the above temperature. 3 parts by volume of caustic soda solution (36° Bé.) and 1 part of hydrosulphite are added to the dyebath and the mixture, including the stock vat, adjusted to 2000 parts by volume and the stock vat added. 50 parts of cotton are introduced, handled for 15 minutes and dyed for 1 hour at 50–60° C., wrung out, oxidized for 30 minutes in the air, rinsed, acidified and soaped at the boil. The cotton is dyed very fast black-brown shades.

Example 8

0.5 part of the dyestuff given in Example 4, paragraph 1, is made into a paste with 3 parts by volume of caustic soda solution (36° Bé.) and 100 parts of water at 40–50° C., 1 part of hydrosulphite conc. powder added, and the whole vatted for 30 minutes at the above temperature. The dyebath is then prepared as follows:

900 parts by volume of dye liquor, 1 part by volume of caustic soda solution (36° Bé.) and 0.5 part hydrosulphite conc. powder. Into this bath is poured the vatted dye, and 50 parts of cotton are dyed for 1 hour at 40–50° C. After dyeing for 15 minutes, 10 parts of sodium chloride or anhydrous sodium sulphate are added. After dyeing, the cotton is wrung out, oxidized in the air, rinsed and soaped at the boil for half an hour with 5 parts of soap and 2 parts of sodium carbonate per litre. The cotton is dyed very fast black-brown shades.

What we claim is:

1. An anthrimide-carbazole of the formula:

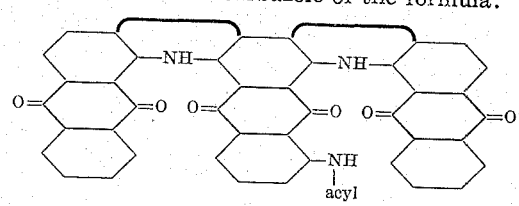

2. An anthrimide-carbazole of the formula:

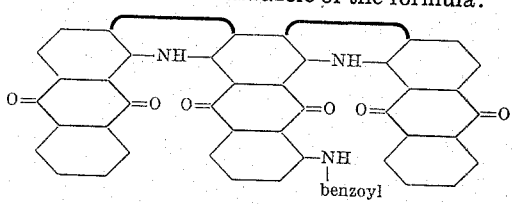

HERMANN HAUSER.
MAX BOMMER.

REFERENCES CITED

The following references are of record in the file of this patent:

UNITED STATES PATENTS

| Number | Name | Date |
| --- | --- | --- |
| 2,026,150 | Utzinger et al. | Dec. 31, 1935 |
| 2,152,186 | Graham | Mar. 28, 1939 |
| 2,284,062 | Mieg | May 26, 1942 |

FOREIGN PATENTS

| Number | Country | Date |
| --- | --- | --- |
| 203,343 | Switzerland | June 1, 1939 |

OTHER REFERENCES

Chem. Abstracts, vol. 4 (1910), page 2114.
Barnett: "Anthracene and Anthraquinone" (1921), page 232, Von Nostrand Co., New York.